Aug. 12, 1941.   H. BANY   2,252,452
CONTROL SYSTEM
Filed Nov. 16, 1938
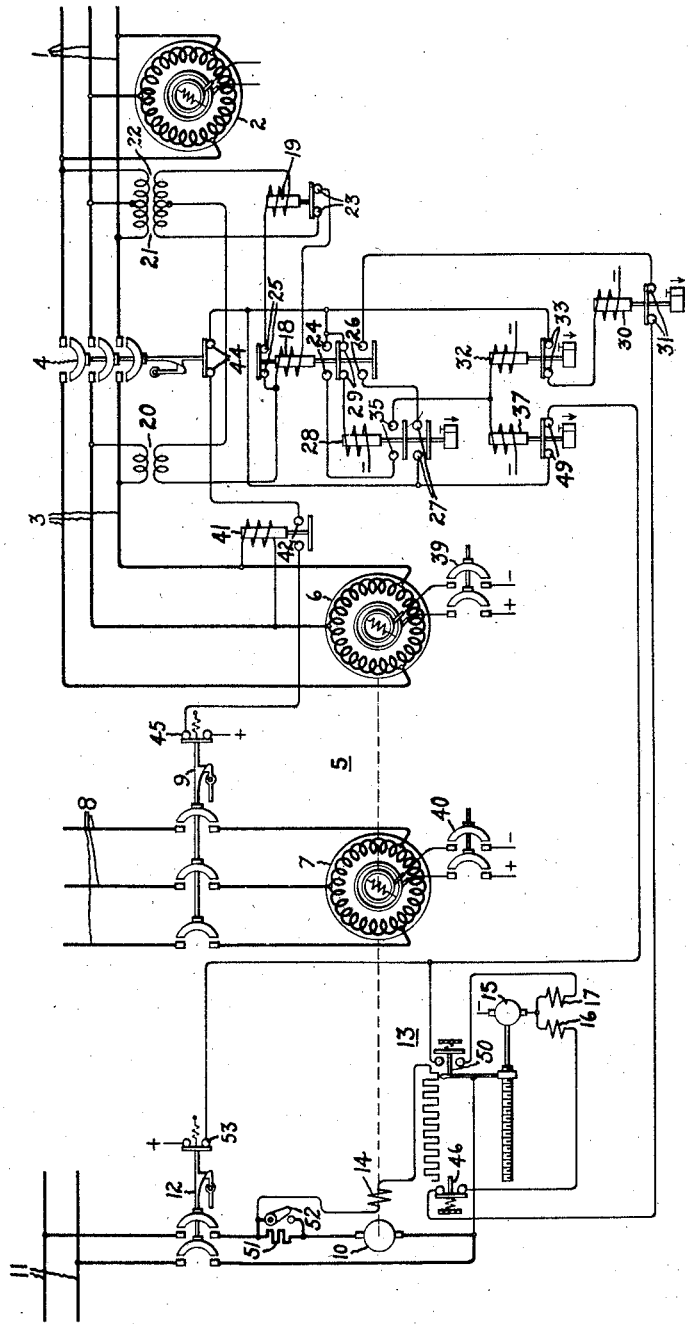
Inventor:
Herman Bany,
by Harry E. Dunham
His Attorney.

Patented Aug. 12, 1941

2,252,452

UNITED STATES PATENT OFFICE 2,252,452

CONTROL SYSTEM

Herman Bany, Lansdowne, Pa., assignor to General Electric Company, a corporation of New York Application November 16, 1938, Serial No. 240,769

14 Claims. (Cl. 171—119)

My invention relates to control systems and particularly to systems for controlling the frequency of one of two alternating current circuits so as to maintain a predetermined relation between the frequencies of the two circuits.

In certain types of automatic synchronizers, such, for example as the one disclosed in my copending application Serial No. 229,333 filed Sept. 10, 1938 and assigned to the same assignee as this application, it is desirable that, prior to the two circuits being connected together, the frequency of one of the two circuits shall be maintained within a small range either just below or just above the frequency of the other circuit, and one object of my invention is to provide an arrangement for accomplishing this result.

My invention will be better understood from the following description when taken in connection with the accompanying drawing, the single figure of which diagrammatically illustrates a frequency control system embodying my invention, and its scope will be pointed out in the appended claims.

Referring to the drawing, I represents a polyphase circuit which may be a part of an alternating current system supplied by a suitable source 2. 3 represents another polyphase circuit which is arranged to be connected to the polyphase circuit I by means of a circuit breaker 4 of any well known type, examples of which are well known in the art. As shown in the drawing, the circuit 3 is adapted to be supplied by a synchronous motor generator 5 comprising a synchronous generator 6 connected to the circuit 3, a synchronous motor 7 connected to another energized polyphase circuit 8 by suitable switching means 9 and an adjustable speed direct current starting motor 10 which is arranged to be connected to a suitable direct current supply circuit 11 by a switch 12. A starting resistor 51 is provided in series with the starting motor 10 and is arranged to be short circuited by the switch 52.

For regulating the speed of the motor 10 so as to maintain the speed of the motor generator 5 within the desired range for synchronizing, a motor-operated rheostat 13 is connected in series with the shunt field winding 14 of the motor 10. As shown, the rheostat 13 is arranged to be operated so as to increase the resistance of the shunt field circuit and thereby increase the speed of the motor 10 when the armature winding 15 and the field winding 16 of the motor driven rheostat are simultaneously energized and to decrease the resistance of the shunt field circuit and thereby decrease the speed of the motor 10 when the armature winding 15 and the field winding 17 of the motor driven rheostat are simultaneously energized.

In the arrangement shown in the drawing, the motor generator 5 is placed in service by first operating the starting motor 10 so as to bring the motor generator 5 up to substantially normal speed. Then one of the synchronous machines is synchronized with its respective circuit after which the other synchronous machine is synchronized with its respective circuit. Various suitable synchronizing means, examples of which are well known in the art, may be employed for controlling the connections of these synchronous machines.

Before synchronizing the first machine of the motor generator 5, it is sometimes desirable to maintain the frequency thereof within a small range either slightly above or below the frequency of the circuit to which it is to be connected. For accomplishing this result, I provide an arrangement for controlling the operation of the motor 15 so as to maintain within the desired range the frequencies of one of the synchronous machines and the electric circuit to which it is to be connected. In the particular embodiment of the invention shown in the drawing, the speed of the motor 15 is controlled so as to maintain the frequency of the generator 6 and circuit 3 within a small range slightly below the frequency of the circuit 1. This frequency control arrangement includes a relay 18 which is so connected to the circuits 1 and 3 that it is energized in response to a resultant of certain voltages of the two circuits. As shown, the relay 18 is connected by the potential transformers 20 and 21 so that it is energized in response to the resultant of corresponding phase voltages of the circuits 1 and 3. With the relay 18 connected in the manner shown in the drawing, the voltage applied to the relay winding oscillates between a minimum value and a maximum value once during each slip cycle and the relay is designed so that, during a portion of each slip cycle, the resultant voltage applied to the relay winding is sufficient to cause the relay to close its normally open contacts 24 and 26 and to open its normally closed contacts 25 and 29. Since the relay 18 drops out at a lower voltage than that required to pick it up, the portion of each slip cycle during which the contacts 24 and 26 of relay 18 are closed is greater than the portion during which they are open.

Each time the relay 18 opens its contacts 29 the energizing circuit of a time delayed drop-out relay 28 is opened. The relay 28 has contacts 27 which are connected in series with contacts 26 of relay 18 in an energizing circuit for the armature winding 15 and the field winding 16 of the motor-operated rheostat 13 so that, as long as the duration of the portion of each slip cycle, during which the contacts 29 of relay 18 are open, is shorter than the drop-out time of relay 28, the motor-operated rheostat 13 is operated to increase the speed of the motor generator 5 and thereby increase the frequency of the generator 6 and the circuit 3 during the entire portion of each slip cycle that the contacts 26 are closed.

When the slip frequency decreases so that the portion of each slip cycle during which the relay contacts 29 are opened is longer than the dropout time of the relay 28, the length of time the rheostat 13 is operated to effect an increase in the speed of the motor 15 is equal to the dropout time of the relay 28 so that an anti-hunting effect is produced because, as the slip frequency decreases, the rheostat 13 is operated to increase the frequency of the generator 6 and circuit 3 during a shorter portion of each slip cycle.

In order to prevent the frequency of the circuit 3 from being increased to such a value as to reduce the frequency difference below a predetermined amount, I provide in the circuit of the armature winding 15 and field winding 16 of the motor-operated rheostat 13, the contacts 31 which are opened whenever the contacts 27 of relay 28 are closed while the frequency difference between the voltages of the circuits 1 and 3 is less than a predetermined value. The contacts 31 are contacts of a relay 30 which is designed in any suitable manner so that the contacts 31 are opened as soon as the operating winding of relay 30 is energized but are not closed until after the operating winding has been deenergized for a predetermined time. The energizing circuit of the operating winding of relay 30 includes the contacts 33 of a relay 32 which is of the same type as relay 30 except that the time elapsing between the deenergization of its operating winding and the closing of its contacts 33 is shorter than the time elapsing between the deenergization of the operating winding of relay 30 and the closing of contacts 31. The energizing circuit of relay 32 is arranged to be completed through contacts 24 of relay 18 and contacts 35 of relay 28 in series as long as the relay 28 remains in its energized position while the relay 18 is picked up.

In case the frequency difference between the circuits 1 and 3 is reduced to such a small value that a relatively long time interval may elapse before the desired phase relation occurs for synchronizing, I provide means for effecting a decrease in the speed of the motor 10 to increase the frequency difference whenever the frequency difference between the circuits 1 and 3 decreases below a predetermined value. This result is accomplished in the arrangement shown in the drawing by the time relay 37 which is controlled by the relays 18 and 28 so that it completes an energizing circuit for the armature winding 15 and the field winding 17 of the motor-operated rheostat 13 whenever the duration of a slip cycle exceeds a predetermined value.

In order to prevent the relay 18 from controlling the operation of the rheostat 13 in case the frequency of the generator 6 should for any reason exceed the frequency of the circuit 1, I provide in the energizing circuit of the relay 18 the contacts 23 of a relay 19 which is connected to the circuits 1 and 3 in a manner well known in the art so that, when the frequency of the circuit 3 is higher than the frequency of the circuit 1, the relay 19 opens its contacts 23 and prevents the relay 18 from picking up. As shown, the relay 19 is connected by the contacts 25 of relay 18 and the transformers 20 and 21 in such a manner that it is energized in response to a different resultant voltage of the circuits 1 and 3 which, when the frequency of circuit 1 is lower than the frequency of circuit 3, reaches its maximum value during each slip cycle before the resultant voltage applied to the relay 18 reaches its maximum value and which, when the frequency of circuit 3 is lower than the frequency of circuit 1, reaches its maximum value during each slip cycle after the resultant voltage applied to the relay 18 reaches its maximum value. This particular arrangement of selectively operating two relays in response to the relative frequencies of two circuits is disclosed and claimed in U. S. Patent 1,843,788 granted February 2, 1932 to the assignee of this application.

The operation of the arrangement shown in the drawing is as follows:

When the motor generator 5 is shut down, the control apparatus is in the condition shown in the drawing. When it is desired to place the motor generator 5 in service, the switch 12 is closed so as to connect the starting motor 10 to the direct current supply circuit 11, after which the switch 52 is closed to short-circuit the starting resistor 51. The field switches 39 and 40 are then closed to excite the field windings of the synchronous machines 6 and 7 respectively. As soon as the voltage of the armature winding of the synchronous machine 6 builds up to a predetermined value thereby indicating that the machine is operating at a speed near its synchronous speed, a voltage or frequency relay 41, which is connected to the armature winding of the synchronous machine 6, closes its contacts 42 and renders the frequency control apparatus operative to regulate the speed of the motor 10 to vary the frequency of the circuit 3.

After the switch 42 closes, an energizing circuit is completed for relay 28 through contacts 29 of relay 18, contacts 44 of switch 4, contacts 42 of relay 41 and contacts 45 of switch 9 during that portion of each cycle of slip in which the relay 18 is in its deenergized position. During that portion of each cycle of slip in which the relay 18 is in its picked-up position and while the relay 28 is still in its energized position, energizing circuits are completed for the relays 32 and 37 and a circuit is completed for the motor-operated rheostat 13 so that it is operated to increase the resistance in the circuit of the shunt field winding 14 in order to increase the speed of the motor 10 and the frequency of the circuit 3. The energizing circuits for the operating windings of relays 32 and 37, which are connected in parallel, include contacts 35 of relay 28, contacts 24 of relay 18, contacts 44 of switch 4, contacts 42 of relay 41 and contacts 45 of switch 9. The operating circuit for the motor-operated rheostat 13 includes the armature winding 15, field winding 16 and limit switch 46 of the rheostat 13, contacts 31 of relay 30, contacts 26 of relay 18, contacts 27 of relay 28, contacts 44 of switch 4, contacts 42 of relay 41 and contacts 45 of switch 9. Therefore, when the frequency difference of the circuits 1 and 3 is above a predetermined value, which is determined by the combined drop-out times of relays 28 and 32, the motor-operated rheostat 13 is operated during a portion of each cycle of slip to increase the speed of the motor 10 and thereby decrease the frequency difference between the circuits 1 and 3.

Since the relay 28 limits the length of time the rheostat 13 is operated during each slip cycle after the slip frequency is slow enough to allow the relay 28 to drop out while the contacts 29 are open, it will be apparent that an anti-hunting effect is produced because, as the slip frequency decreases, the portion of the total slip cycle during which the rheostat 13 is operated to increase the speed of the motor 10 is decreased until the slip cycle is long enough to cause the relay contacts 29 to remain open for a sufficient time to allow the relay 32 to close its contact 33 and complete an energizing circuit for relay 30. Relay 30, by opening its contact 31, interrupts the speed increasing circuit of the rheostat 13 and by making the drop-out time of the relay 30 slightly longer than the combined drop-out times of the relays 28 and 32 the relay 30 maintains the speed increasing circuit of the rheostat 13 open as long as the frequency of the circuit 3 is such that the duration of a slip cycle is equal to or greater than the combined drop-out times of the relays 28 and 32.

In case, however, the frequency difference becomes very small, the length of time that relay 18 remains picked-up is long enough to allow the relay 37, which has a longer drop-out time than relay 32, to drop out and complete an energizing circuit for the field winding 17 and armature 15 of the motor-operated rheostat 13 so as to increase the excitation of the field winding 14 and thereby effect a decrease in the frequency of the generator 6 and of the circuit 3.

For the purpose of illustration, it will be assumed that it is desired to maintain a frequency difference between the circuits 1 and 3 of not more than ⅓ cycle per second and of not less than ⅕ cycle per second and that for accomplishing this result the drop-out times of the relays 28 and 32 are ½ and 2½ seconds respectively so that total of the two drop-out times is 3 seconds, that the drop-out time of relay 30 is 3½ seconds, and that the drop-out time of relay 37 is 4½ seconds. Also that the relay 18 is designed so that with normal voltages across the circuits 1 and 3 it is in its picked-up position during two-thirds of each slip cycle.

With the relays 18, 28, 30 and 32 arranged in this manner, it will be seen that for all frequency differences of more than ⅓ of a cycle per second the relay 18 is in its picked-up time for less than ½ a second during each slip cycle so that the relay 28 remains in its picked-up position. Therefore, during each slip cycle, the speed raising circuit of the rheostat 13 through the field winding 16 and armature 15 is completed by the contacts 26 of the relay 18 for a time equal to ⅔ of the slip cycle.

When the frequency difference is ⅓ of a cycle per second or less, the relay 18 remains in its picked-up position for at least a ½ second, the drop-out time of relay 28, so that this relay opens its contacts 27 in the speed raising circuit of the rheostat and prevents the rheostat 13 from being operated more than a ½ second during each slip cycle.

When the frequency difference is a third of a cycle per second or less, the relay 18 remains in its picked-up position for 2 seconds or longer during each slip cycle and remains in its dropped out position for a second or longer during each slip cycle. Therefore, the circuit of the relay 32 is open at contacts 35 of time relay 28 for more than one and one-half seconds during each slip cycle, while the relay 18 is picked-up, and at contacts 24 for more than a second while the relay 13 is in its dropped out position so that the total continuous time that the relay 32 is deenergized during each slip cycle is at least 2½ seconds, the drop-out time of the relay 32. By closing its contacts 33, relay 32 completes an energizing circuit for relay 30 through contacts 44 of the circuit breaker 4, contacts 42 of relay 41, and contacts 45 of circuit breaker 9. By opening its contacts 31, relay 30 opens the operating circuit of the rheostat 13 through the field winding 16 and armature winding 15 of the rheostat motor.

Since the drop-out time of relay 30 is slightly longer than the combined drop-out time of the relays 28 and 32, the relay 30 maintains its contacts 31 open during that 3 second interval of each slip cycle when the relay 32 is in its picked-up position. Therefore, as long as the frequency difference is ⅓ of a cycle per second or less, the relay contacts 31 in the speed raising circuit of the rheostat 13 are maintained continuously in their open position.

If the frequency difference between the circuits 1 and 2 is decreased so that it is ⅕ of a cycle per second or less, the relay 18 is in its picked-up position 3⅓ seconds or longer during each slip cycle and in its dropped out position 1⅔ seconds or longer during each slip cycle. Therefore, while the relay 18 is picked-up, the relay 37 is deenergized at least 3⅓—½ seconds or 2⅚ seconds and while the relay 18 is dropped out, the relay 37 is deenergized at least 1⅔ seconds or a total of at least 2⅚+1⅔ or 4½ seconds during each slip cycle, which is the drop-out time of relay 37. Relay 37, therefore, maintains its contacts 49 closed for a time equal to the difference between five seconds and the duration of the slip cycle when the frequency difference between the circuits 1 and 3 is less than ⅕ cycle per second so that the arrangement is anti-hunting since the length of time that the rheostat 13 is operated varies inversely with the frequency difference.

The closing of the contacts 49 of relay 37 completes a circuit through armature winding 15, field winding 17 and limit switch 50 of the motor-operated rheostat 13, contacts 49 of relay 37, contacts 44 of switch 4, contacts 42 of relay 41 and contacts 45 of switch 9. The energization of this circuit for the motor-operated rheostat 13 causes the resistance of the circuit of the field winding 14 to be decreased so as to decrease the speed of the motor 10 and thereby increase the frequency difference between the circuits 1 and 3 to the desired value.

In case the frequency of the generator 6 should for any reason increase above the frequency of the circuit 1 the relay 19 picks up during each slip cycle and by opening its contacts 23 prevents the relay 18 from picking up. Therefore both of the time relays 32 and 37 remain in their dropped-out position so that the relay 30 is energized to interrupt the speed raising circuit of the rheostat 13 and the speed lowering circuit for the rheostat through contacts 49 of relay 37 is completed to effect a decrease in the speed of the motor 10 and in the frequencies of the generator 6.

When the frequency difference between the circuits 1 and 3 is within the desired range, one of the switches 4 and 9 may be closed in any suitable manner to synchronize one of the synchronous machines after which the switch 12 is opened to disconnect the starting motor 10 from the direct current supply circuit 11 and then the other of the switches 4 and 9 is closed in any suitable manner. When either the switch 4 or the switch 9 is closed, the opening of its auxiliary contacts opens the heretofore described controlled circuits of the frequency control apparatus so as to render it inoperative to control the speed of the motor 10. When the switch 12 is opened, a circuit is completed through its auxiliary contacts 53 for the armature winding 15 and field winding 17 of the motor-operated rheostat 13 to restore it to its normal starting position. While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States, is:

1. An arrangement for controlling the frequency of one of two alternating current circuits including means for varying the frequency of one of said circuits, and means dependent upon the duration of a slip cycle being less than a predetermined amount when the frequency of a predetermined one of said circuits is less than the frequency of the other circuit for controlling said frequency varying means so as to decrease the frequency difference between said circuits.

2. An arrangement for controlling the frequency of one of two alternating current circuits including means for varying the frequency of one of said circuits, means responsive to the resultant of two voltages obtained from said circuits for effecting the operation of said frequency varying means to decrease the frequency difference between said circuits when the frequency of a predetermined one of said circuits is less than the frequency of the other circuit, and means responsive to a slip cycle of more than a predetermined duration for preventing further operation of said frequency varying means to decrease the frequency difference as long as the slip cycles are longer than said predetermined duration.

3. An arrangement for controlling the frequency of one of two alternating current circuits including means for varying the frequency of one of said circuits, means responsive to the resultant of two voltages obtained from said circuits exceeding a predetermined value for effecting the operation of said frequency varying means to decrease the frequency difference between said circuits when the frequency of a predetermined one of said circuits is less than the frequency of the other circuit, and means dependent upon said resultant voltage remaining above said predetermined value for a predetermined time for preventing further operation of said frequency varying means to decrease the frequency difference as long as the slip cycles are more than said predetermined duration.

4. An arrangement for controlling the frequency of one of two alternating current circuits including means for varying the frequency of one of said circuits, means responsive to the resultant of two voltages obtained from said circuits exceeding a predetermined value for effecting the operation of said frequency varying means to decrease the frequency difference between said circuits when the frequency of a predetermined one of said circuits is less than the frequency of the other circuit, and timing means controlled by said resultant voltage responsive means for preventing the operation of said frequency varying means to decrease the frequency difference during slip cycles of more than a predetermined duration.

5. An arrangement for controlling the frequency of one of two alternating current circuits including means for varying the frequency of one of said circuits, and means responsive to the magnitude of the resultant of two voltages obtained from said circuits for effecting the operation of said frequency varying means to decrease the frequency difference between said circuits when the frequency of a predetermined one of said circuits is less than the frequency of the other circuit and the frequency difference is more than a predetermined value above zero and for preventing further operation of said frequency varying means to decrease said frequency difference as long as it is less than said predetermined value above zero.

6. An arrangement for controlling the frequency of one of two alternating current circuits including means for varying the frequency of one of said circuits, a control circuit, means responsive to the energization of said control circuit for effecting the operation of said frequency varying means to decrease the frequency difference between said alternating current circuits, a relay connected to said alternating current circuits so that it operates in response to the resultant of two voltages obtained from said alternating current circuits and having contacts in said control circuit which are closed to complete said control circuit when said resultant voltage is above a predetermined value, timing means controlled by said relay for opening said control circuit after said resultant voltage has remained above said predetermined value for a predetermined time, and means controlled by said relay and said timing means for maintainng said control circuit deenergized in response to frequency differences of less than a predetermined value.

7. An arrangement for controlling the frequency of one of two alternating current circuits including means for varying the frequency of one of said circuits, a control circuit, means responsive to the energization of said control circuit for effecting the operation of said frequency varying means to decrease the frequency difference between said alternating current circuits, a time delayed drop-out relay having normally closed contacts in said control circuit, an energizing circuit for said relay, a second time delayed drop-out relay having normally closed contacts in said energizing circuit, a relay connected to said alternating current circuits so that it operates in response to the resultant of two voltages obtained from said alternating current circuits and having contacts in said control and energizing circuits which are closed when said resultant voltage is above a predetermined value, and means controlled by said resultant voltage responsive relay for opening said energizing circuit a predetermined time after said resultant voltage has remained above said predetermined value for a predetermined time.

8. An arrangement for controlling the frequency of one of two alternating current circuits including means for varying the frequency of one of said circuits, a control circuit, means responsive to the energization of said control circuit for effecting the operation of said frequency varying means to decrease the frequency difference between said alternating current circuits, a time delayed drop-out relay having normally closed contacts in said control circuit, an energizing circuit for said relay, a second time delayed drop-out relay controlling said energizing circuit, a relay connected to said alternating current circuits so that it operates in response to the resultant of two voltages obtained from said alternating current circuits and having contacts in said control and energizing circuits which are closed when said resultant voltage is above a predetermined value, other contacts in said energizing circuit and means controlled by said resultant voltage responsive relay for operating said contacts a predetermined time after said resultant voltage has remained above said predetermined value for a predetermined time.

9. An arrangement for controlling the frequency of one of two alternating current circuits including means for varying the frequency of one of said circuits, and means responsive to the length of time that the resultant of two voltages obtained from said circuits is above and below a predetermined value during a slip cycle for effecting the operation of said frequency varying means so as to decrease the frequency difference when said difference is more than a predetermined amount and so as to increase the frequency difference when said difference is less than a second predetermined amount which is smaller than said first mentioned predetermined amount.

10. An arrangement for controlling the frequency of one of two alternating current circuits including means for varying the frequency of one of said circuits, and means responsive to the length of time that the resultant of two voltages obtained from said circuits is above and below a predetermined value during a slip cycle for effecting the operation of said frequency varying means so as to maintain the frequency of one of said circuits within a predetermined range below the frequency of the other of said circuits.

11. An arrangement for controlling the frequency of one of two alternating current circuits including means for varying the frequency of one of said circuits, and means dependent upon the duration of a slip cycle being less than a predetermined amount when the frequency of a predetermined one of said circuits is less than the frequency of the other circuit for controlling said frequency varying means so as to decrease the frequency difference between said circuits and upon the duration of a slip cycle being more than a second predetermined amount for controlling said frequency varying means so as to increase the frequency difference between said circuits.

12. An arrangement for controlling the frequency of one of two alternating current circuits including means for varying the frequency of one of said circuits, means responsive to the resultant of two voltages obtained from said circuits exceeding a predetermined value for effecting the operation of said frequency varying means to decrease the frequency difference between said circuits when the frequency of a predetermined one of said circuits is less than the frequency of the other circuit, and means dependent upon said resultant voltage remaining above said predetermined value for a predetermined time for preventing further operation of said frequency varying means to decrease the frequency difference as long as the slip cycles are more than said predetermined duration and for effecting the operation of said frequency varying means to increase the frequency difference if the slip cycles exceed a predetermined duration.

13. An arrangement for controlling the frequency of one of two alternating current circuits including means for varying the frequency of one of said circuits, means responsive to the resultant of two voltages obtained from said circuits exceeding a predetermined value for effecting the operation of said frequency varying means to decrease the frequency difference between said circuits when the frequency of a predetermined one of said circuits is less than the frequency of the other circuit, and timing means controlled by said resultant voltage responsive means for preventing the operation of said frequency varying means to decrease the frequency difference during slip cycles of more than a predetermined duration and for effecting the operation of said frequency varying means to increase the frequency difference if the slip cycles exceed a predetermined duration.

14. An arrangement for controlling the frequency of one of two alternating current circuits including means for varying the frequency of one of said circuits, a control circuit, means responsive to the energization of said control circuit for effecting the operation of said frequency varying means to decrease the frequency difference between said alternating current circuits, a relay connected to said alternating current circuits so that it operates in response to the resultant of two voltages obtained from said alternating current circuits and having contacts in said control circuit which are closed to complete said control circuit when said resultant voltage is above a predetermined value, timing means controlled by said relay for opening said control circuit after said resultant voltage has remained above said predetermined value for a predetermined time, means controlled by said relay and said timing means for maintaining said control circuit deenergized in response to frequency differences of less than a predetermined value, a normally open control circuit, means responsive to the completion of said normally open control circuit for effecting the operation of said frequency varying means to increase the frequency difference between said alternating current circuits, and means controlled by said relay and said timing means for completing said normally open control circuit in response to frequency differences of less than a predetermined value.

HERMAN BANY.